United States Patent
Yamaguchi

[11] Patent Number: 5,820,793
[45] Date of Patent: Oct. 13, 1998

[54] PROCESS FOR PRODUCING OPTICAL DISK

[75] Inventor: Tohru Yamaguchi, Tochigi-ken, Japan

[73] Assignee: Kao Corporation, Tokyo, Japan

[21] Appl. No.: 628,106

[22] Filed: Apr. 9, 1996

[30] Foreign Application Priority Data

Apr. 18, 1995 [JP] Japan .................................. 7-092800

[51] Int. Cl.⁶ .................................................. B29D 11/00
[52] U.S. Cl. ........................ 264/1.1; 264/1.31; 264/2.5; 264/219
[58] Field of Search .................. 428/156, 187; 264/1.1, 1.31, 2.5, 219; 425/169; 369/280, 282; 249/53 R; 72/31.01; 409/79

[56] References Cited

U.S. PATENT DOCUMENTS

| | | | |
|---|---|---|---|
| 4,379,687 | 4/1983 | Wilson et al. | 435/388 |
| 4,944,982 | 7/1990 | Kikuchi | 428/69.4 |
| 4,954,065 | 9/1990 | Shindo et al. | 428/64.4 |
| 5,057,000 | 10/1991 | Mangone | 425/190 |

FOREIGN PATENT DOCUMENTS

| | | |
|---|---|---|
| 2 620 370 | 3/1989 | European Pat. Off. . |
| 2 473 948 | 7/1981 | France . |
| 1 930 868 | 12/1970 | Germany . |
| 43 15 587 | 8/1994 | Germany . |
| 59-120410 | 7/1984 | Japan . |

*Primary Examiner*—Donald Loney
*Attorney, Agent, or Firm*—Oblon, Spivak, McClelland, Maier & Neustadt, P.C.

[57] ABSTRACT

A molded article having a predetermined shape transferred from a mold, characterized by being provided with an informative mark corresponding to the number of times of use of the mold, and a process for producing the molded article including a molding step of transferring a predetermined shape of a mold to a molded article, the molding step comprising an engraving step of engraving an informative mark indicative of the number of times of use of the mold on the mold before the mold is used and an informative mark transfer step of transferring the informative mark to the molded article.

1 Claim, 1 Drawing Sheet

PROCESS FOR PRODUCING OPTICAL DISK

BACKGROUND OF THE INVENTION

1. Field of the Invention

This invention relates to a process for producing a molded article and more particularly to a molded article which enables visual confirmation of the condition of the mold used and to a process for producing the molded article. 2. Discussion of the Background Various types of molded articles have been used. Included are recorded media such as optical disks, which have recently been attracting attention. In this field of molding, it is a practice generally followed to imprint letters, signs, a bar code, etc. on the area of an optical disk other than the data recorded area so that the content of the disk may be identified by the naked eye. Imprinting of such identifying information is carried out by recording the information on a stamper, a mold for producing an optical disk, and transferring the recorded information to the molded article on stamping.

Thus, the content of the data area of an optical disk can be identified by the identifying information imprinted on the non-data area. In this way, information as to which stamper is used for production of a particular optical disk can also be recorded.

A stamper is sometimes used repeatedly. Because the identifying information is engraved on the stamper at the time of preparing the stamper, it is impossible to tell by visual observation how many times the stamper has been used for production of optical disks. In case rejects occur, one cannot distinguish the number of times of use of the stamper with which the rejects were produced. This has been a disadvantage for production and quality controls.

Once an optical disk having some defect is delivered to a customer, the date of production and other information cannot be determined, which makes it difficult to investigate the cause of the defect or the production trouble.

SUMMARY OF THE INVENTION

An object of the present invention is to provide a molded article excellent in production and quality controllability and a process for producing the same and particularly an optical disk and a process for producing the same.

The inventors of the invention have conducted extensive study to solve the above-mentioned problem and found, as a result, that the above object of the invention is accomplished by adding an imprint each time a stamper is fixed to a molding machine so as to give a production record to a molded product.

That is, the above object of the invention is accomplished by providing a molded article having a predetermined shape transferred from a mold, the molded article being characterized by being provided with an informative mark corresponding to the number of times of use of the mold.

The present invention also provides a preferred process for producing the above-mentioned molded article, the process including a molding step of transferring a predetermined shape of a mold to a molded article, said molding step comprising an engraving step of engraving an informative mark indicative of the number of times of use of said mold on said mold before said mold is used and an informative mark transfer step of transferring said informative mark to the molded article.

The molded article of the invention is provided with the informative mark indicative of the number of times of use of the mold used for the production of the molded article. Therefore, how many times the mold with which a molded article is produced has been used can be visually identified.

The molded article of the invention is excellent in ease of production control and quality control.

In detail, the molded article of the invention can be identified through visual observation as to how many times the stamper used for its production has been used. In case quality problems arise, it is easy to specify the date of production and the like.

According to the process of the invention, the above-described molded article can easily be produced.

DESCRIPTION OF THE PREFERRED EMBODIMENTS

Figure 1:
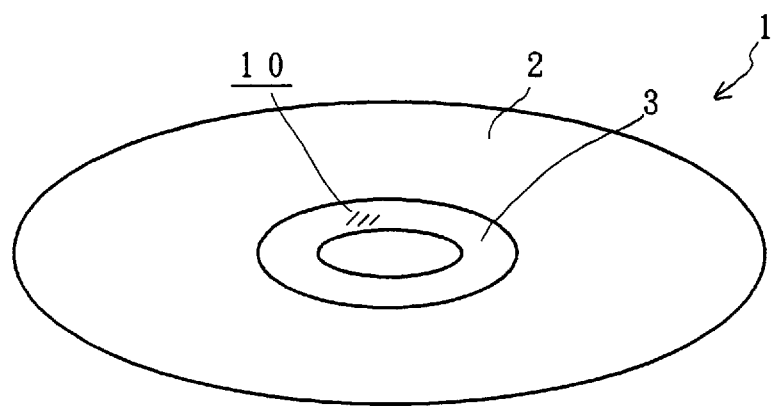
FIG. 1 is a perspective view of an example of the molded articles according to the present invention.

The molded article of the present invention and a process for producing the same will be described below in further detail by way of the embodiments.

While the present invention is applicable to any kind of molded article having its shape received from a mold without particular limitation, it is especially useful in the manufacture of those molded articles whose defects are not revealed until they are played back on a reproducing device, for example optical disks such as compact disks. Accordingly, the invention will be explained with particular reference to optical disks as the molded article.

The optical disk shown in FIG. 1 as the molded article of the invention has a predetermined shape transferred from a stamper as the mold.

In detail, the optical disk 1 comprises a resin molded body (not shown) having a predetermined shape transferred from the stamper, a reflective metal film (not shown) provided on the surface of the resin molded body, and a protective layer (not shown) provided on the surface of the metal film. The optical disk 1 is a common one having a recorded area 2 on which predetermined data have been recorded and a non-recorded area 3 having no data recorded.

The stamper as referred to here is also common, being produced by a conventional process, for example, a process comprising forming a positive photoresist layer on a substrate, e.g., a glass substrate, drying the positive photoresist layer, exposing the resist layer according to desired data, developing the exposed positive photoresist layer, rendering the thus patterned surface in a conventional manner, and forming a metal film on the conductive surface by electroforming.

The optical disk 1 is provided with an informative mark 10 corresponding to the number of times of use of the stamper.

In more detail, the informative mark 10 consists of slashes provided on the non-recorded area 3 of the optical disk 1. One slash corresponds to a single use of the stamper. Three slashes, as in the case of FIG. 1, means that the stamper is in its third use.

The informative mark 10 is not limited to a slash, and various signs such as letters, hyphens, squares, etc. may be used.

The process for producing the above-mentioned optical disk is now described.

The preferred process for producing the optical disk as the molded article can be carried out by performing a molding step in which a molded article having a predetermined shape transferred from a stamper is obtained, the molding step comprising an engraving step of engraving an informative mark indicative of the number of times of use of the stamper on the stamper before it is used and an informative mark transfer step of transferring the engraved informative mark to the molded article.

The engraving step can be carried out by putting the above-described informative mark on a finished stamper on its area corresponding to the non-recorded area by means of, for example, a needle or a stylus for scratching, an electrical discharge, a laser beam, etc.

The informative mark transfer step can be performed simultaneously with the transfer of the predetermined shape, i.e., molding into a molded article. In other words, the informative mark is transferred to a molded article upon transferring the predetermined shape (a shape in conformity to desired data) by compression molding, injection molding, photopolymerization, and the like.

After completion of the informative mark transfer step, a metal layer is formed on the resulting molded article by, for example vacuum evaporation, and a protective layer is further provided thereon. If desired, labeling may be printed to complete the optical disk.

What is claimed is:

1. A process for producing an optical disk comprising the steps of (1) engraving an informative mark on a mold indicative of the number of times of use of said mold before each use of said mold and (2) transferring said informative mark from said mold to the optical disk.

* * * * *